United States Patent
Davis et al.

(10) Patent No.: US 10,070,624 B2
(45) Date of Patent: Sep. 11, 2018

(54) PET GROOMING ATTACHMENT FOR A HANDHELD POWER TOOL

(71) Applicants: Robert Bosch Tool Corporation, Broadview, IL (US); Robert Bosch GmbH, Stuttgart (DE)

(72) Inventors: Marla L. Davis, Rolling Meadows, IL (US); Brandon Eble, Chicago, IL (US); Jeremy Rubens, Palatine, IL (US); Balazs Nagy, Roselle, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 82 days.

(21) Appl. No.: 15/395,972

(22) Filed: Dec. 30, 2016

(65) Prior Publication Data

US 2018/0184620 A1    Jul. 5, 2018

(51) Int. Cl.
*B24B 23/00* (2006.01)
*A01K 17/00* (2006.01)
*A45D 29/05* (2006.01)

(52) U.S. Cl.
CPC .............. *A01K 17/00* (2013.01); *A45D 29/05* (2013.01)

(58) Field of Classification Search
CPC ..... B24B 23/02; B24B 23/026; B24B 23/028; B24B 23/08; B24B 55/102; B24B 45/006; A01K 17/00; A45D 29/05
USPC ....................................................... 451/359
See application file for complete search history.

(56) References Cited

U.S. PATENT DOCUMENTS

| | | | | |
|---|---|---|---|---|
| 1,653,748 A | * | 12/1927 | Hamersveld | B24B 23/026 173/170 |
| 2,906,067 A | * | 9/1959 | Hale | B24B 23/02 451/358 |
| 4,753,253 A | * | 6/1988 | Hutson | A45D 29/05 132/73.6 |
| 5,123,430 A | * | 6/1992 | Davidovitz | A45D 29/02 132/73.6 |
| D330,091 S | * | 10/1992 | Anema | D28/58 |
| 5,864,746 A | * | 1/1999 | Chang | A45D 29/05 451/296 |
| 6,640,811 B2 | | 11/2003 | Cho | |
| 6,865,812 B1 | * | 3/2005 | Martin, Jr. | A45D 29/18 30/27 |
| D553,295 S | * | 10/2007 | Khubani | D28/53 |
| 7,428,881 B2 | | 9/2008 | Drelinger | |
| D596,357 S | | 7/2009 | Rosen | |

(Continued)

*Primary Examiner* — George Nguyen
(74) *Attorney, Agent, or Firm* — Maginot Moore & Beck LLP

(57) ABSTRACT

An attachment is configured to be used with a hand-held rotary power tool. The attachment includes a housing, a sanding disk, and a cap. The housing has a first portion hingedly connected to a second portion so as to be rotatable into a closed configuration. The housing receives the sanding disk when the housing is positioned in the closed configuration. The cap is coupled to the first and second portions of the attachment housing when the housing is positioned in the closed configuration. The cap includes an end that is closed by an access portion and a guiding portion. The access portion includes an opening configured to provide access through the cap to the abrasive surface of the sanding disk when the cap is coupled to the housing.

20 Claims, 13 Drawing Sheets

(56) References Cited

U.S. PATENT DOCUMENTS

| | | | |
|---|---|---|---|
| 8,469,039 B2* | 6/2013 | Jackson | A45D 29/05 132/200 |
| 8,496,013 B2* | 7/2013 | McCourtney | A45D 29/22 132/73.5 |
| 2007/0113795 A1* | 5/2007 | Hajjar | A01K 13/002 119/608 |
| 2011/0226270 A1 | 9/2011 | Rivera | |

* cited by examiner

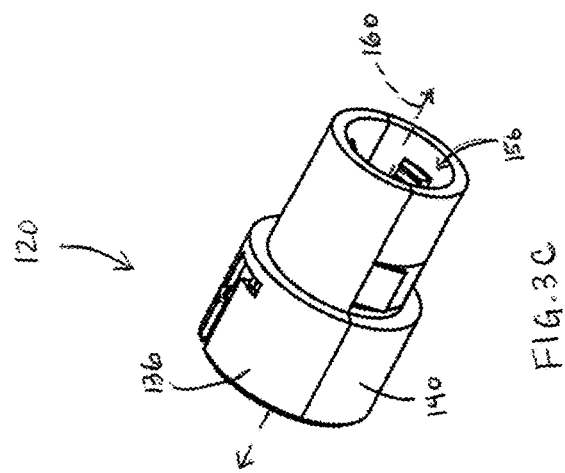
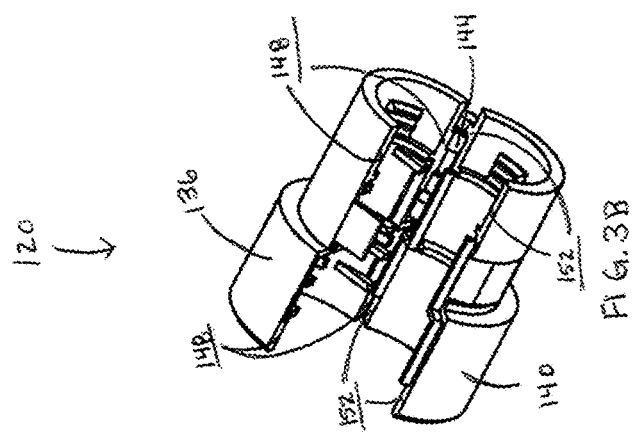
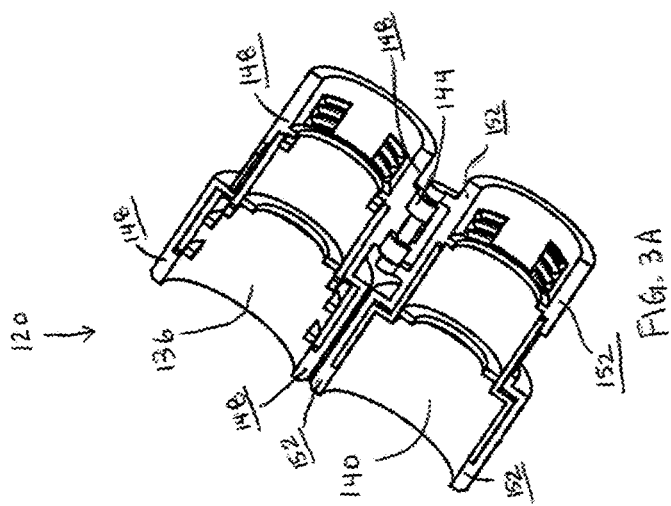

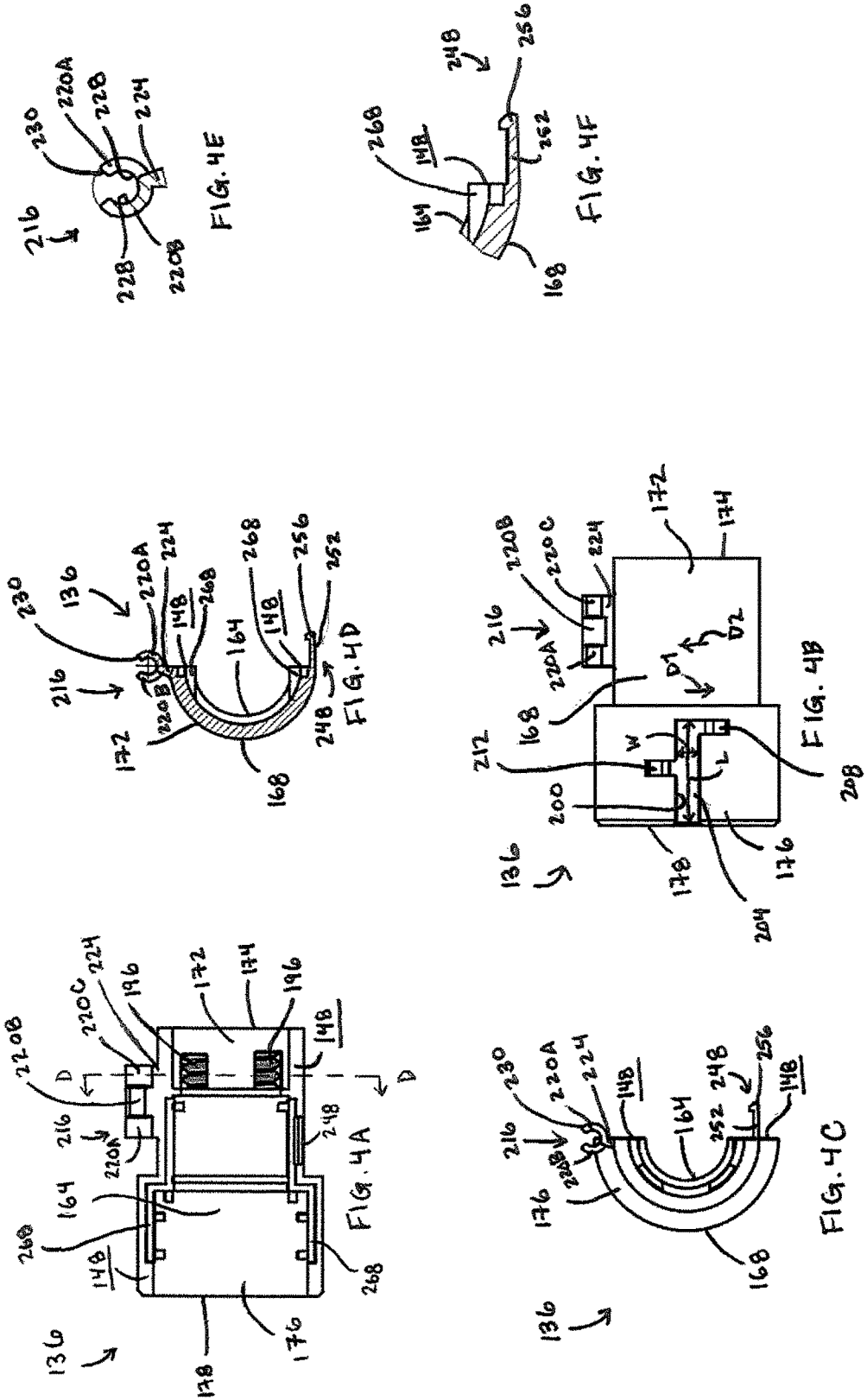

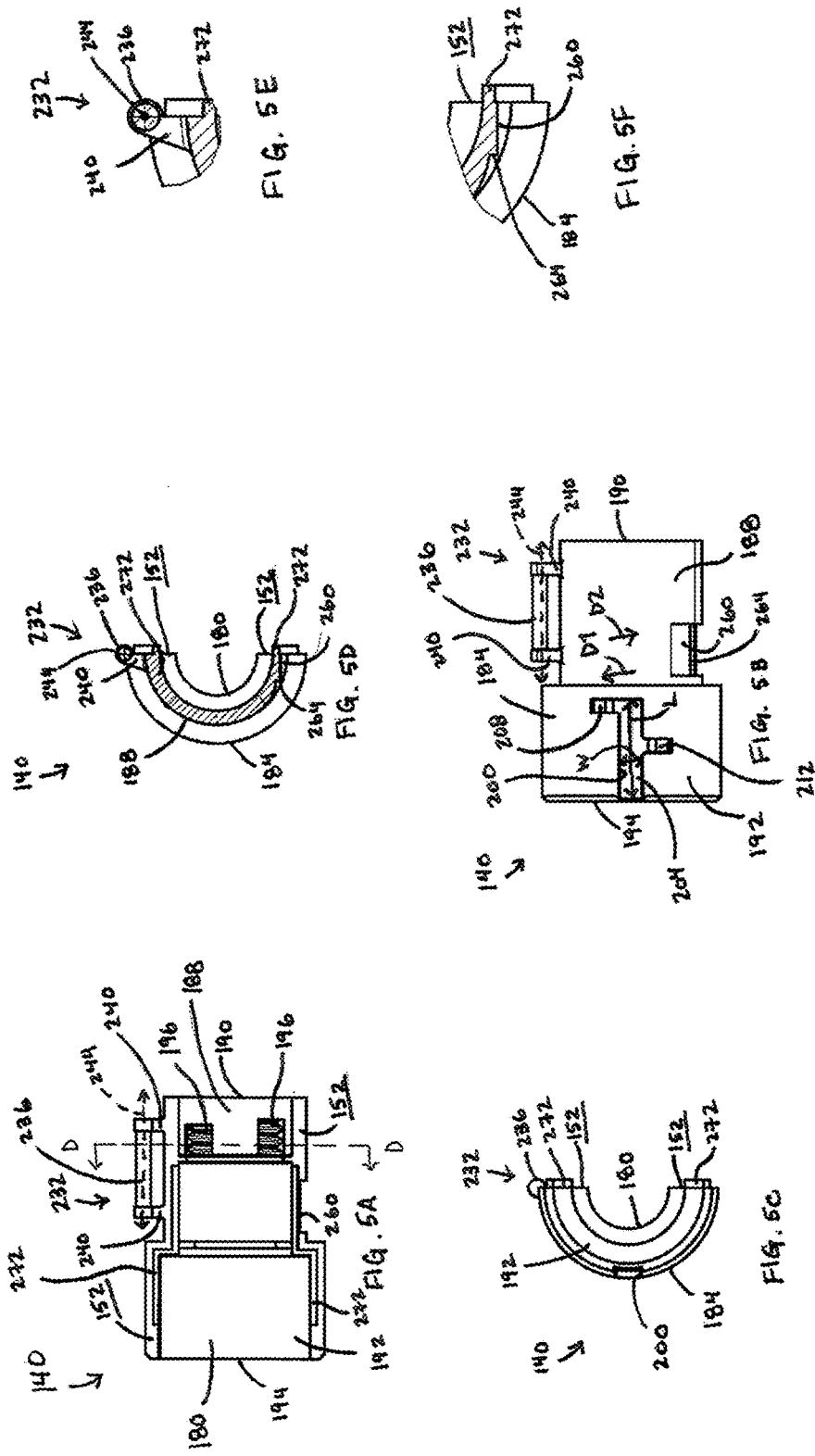

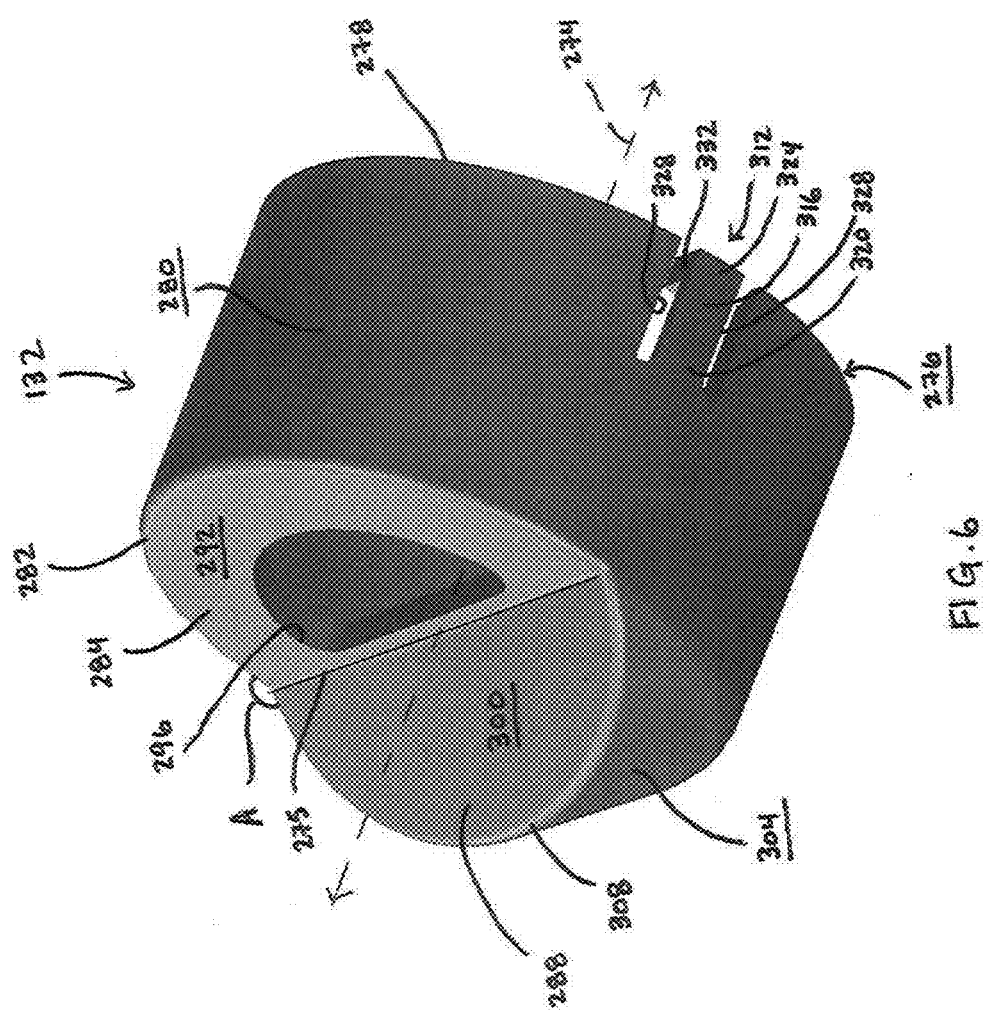

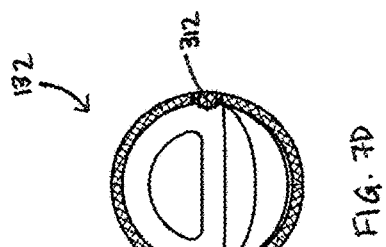
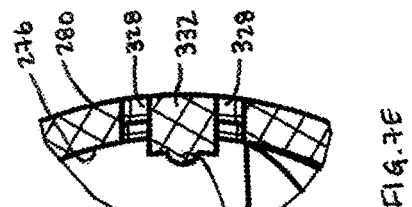
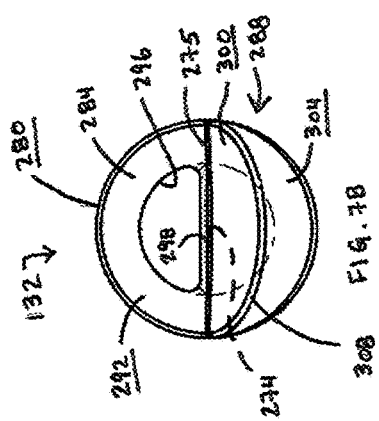
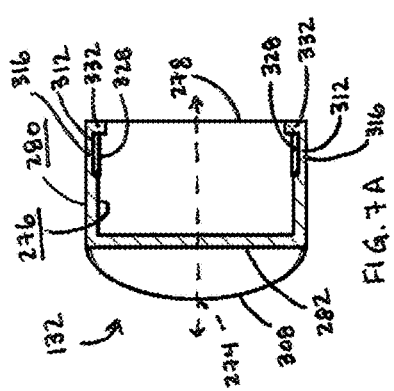
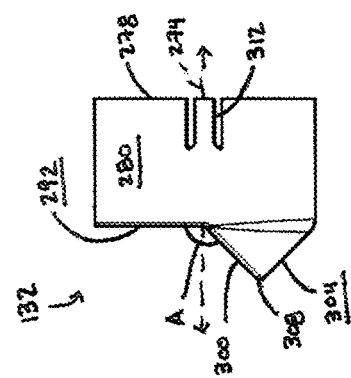

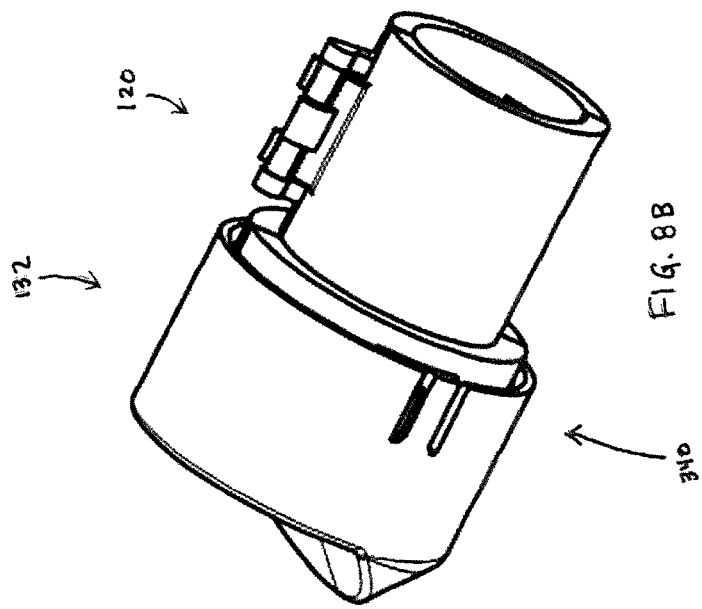
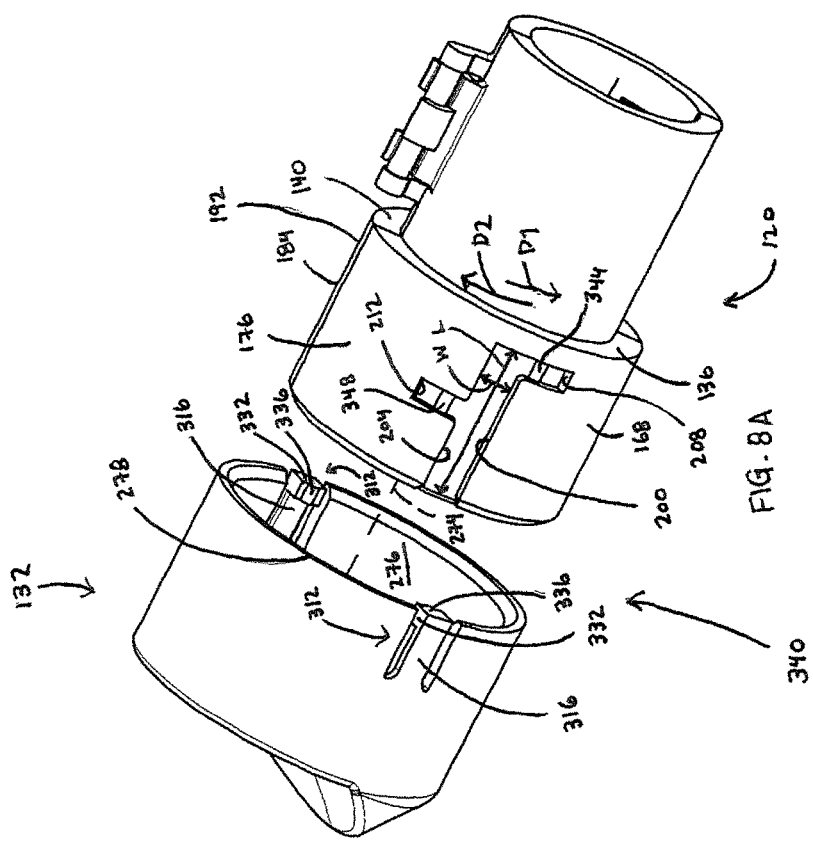

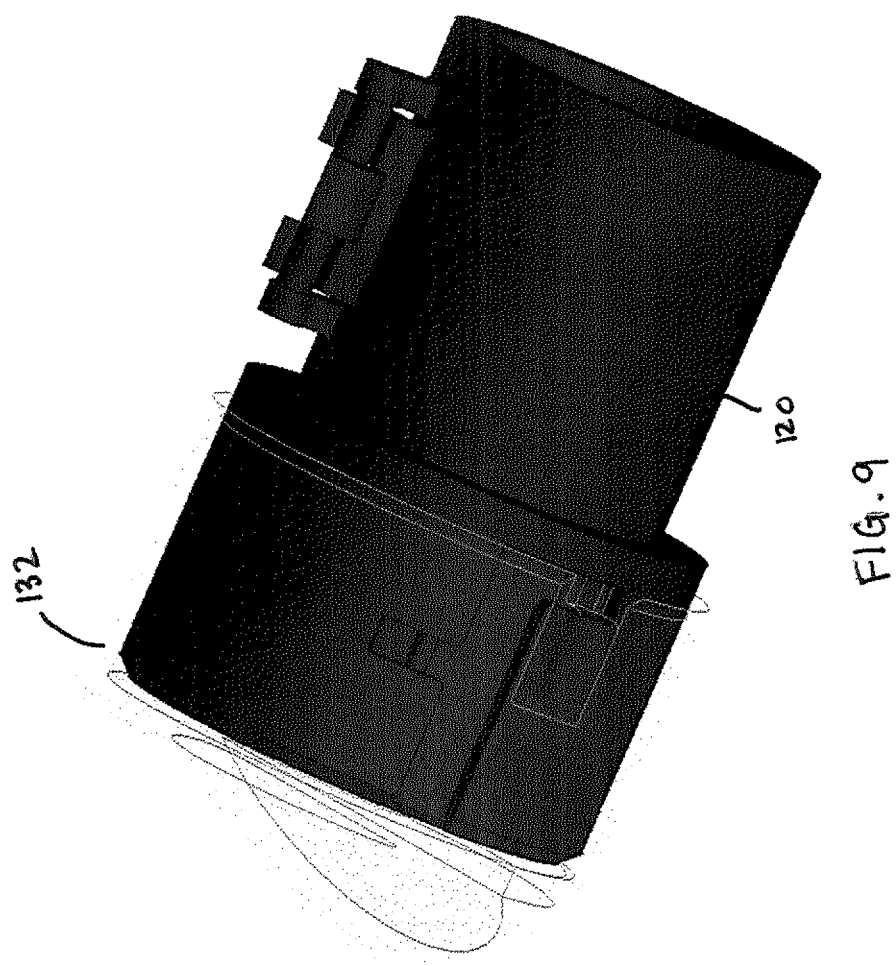

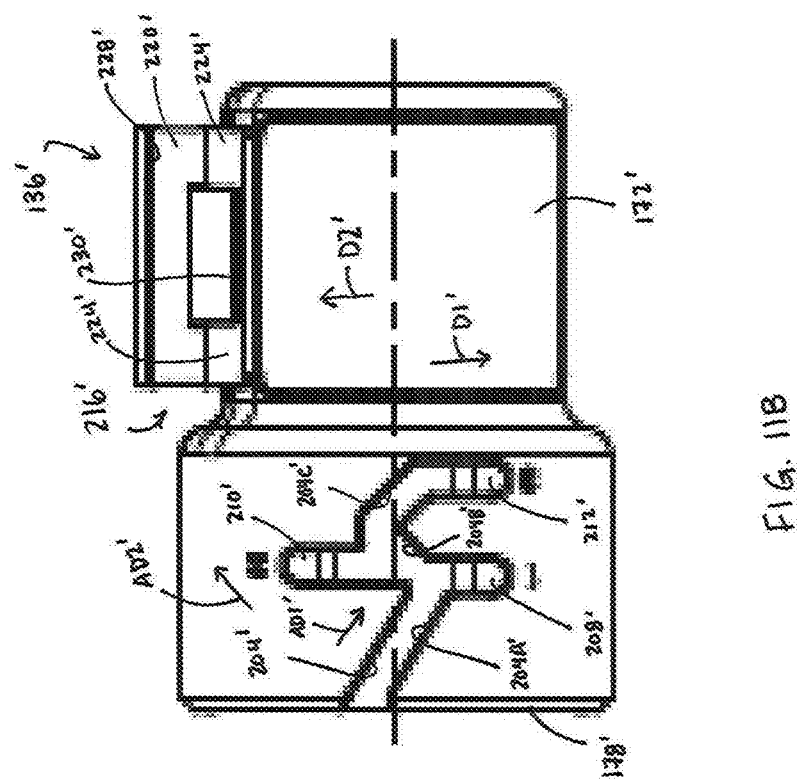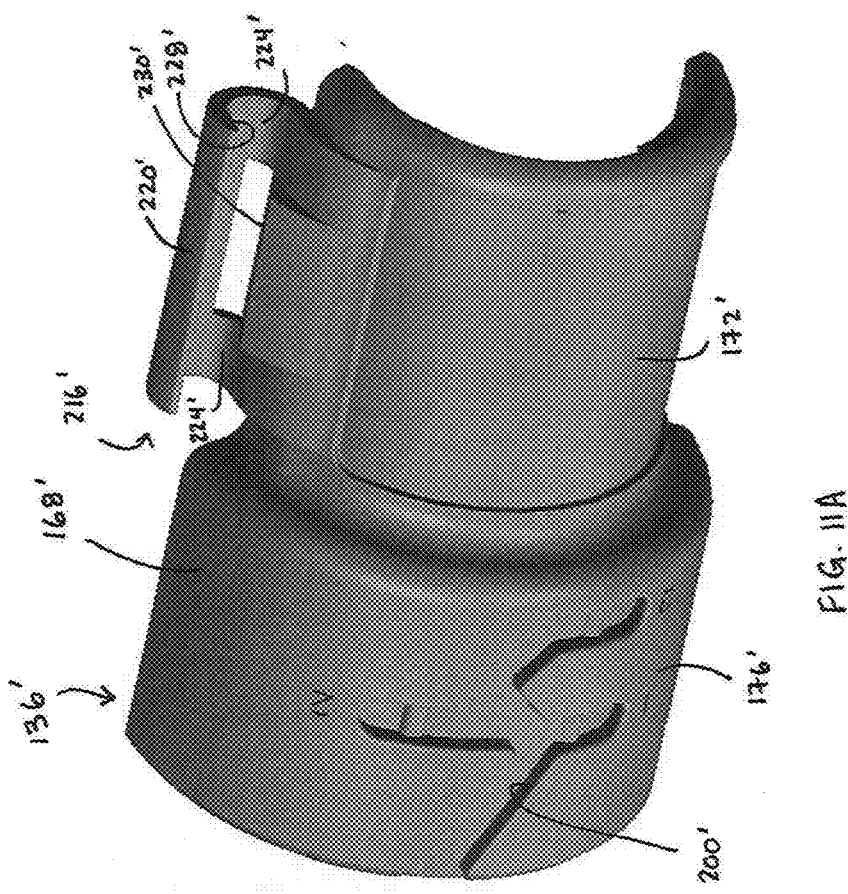

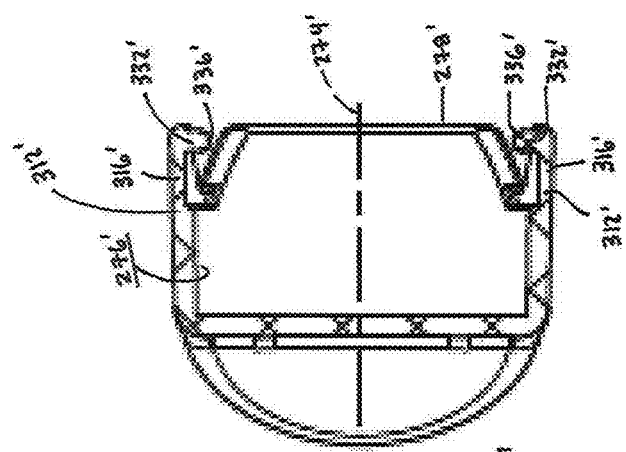
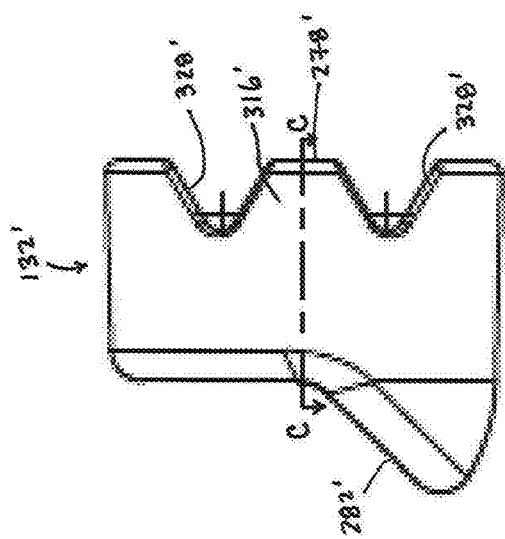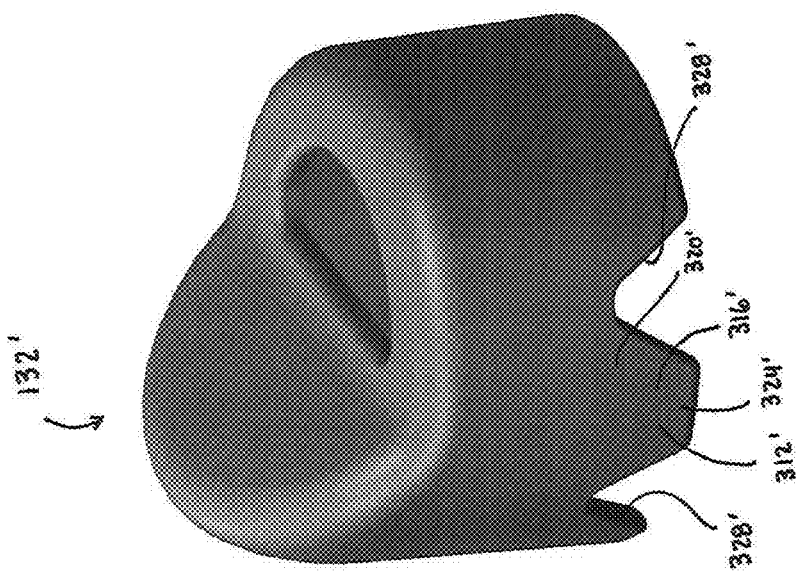

PET GROOMING ATTACHMENT FOR A HANDHELD POWER TOOL

BACKGROUND

Grooming pets can be a difficult task, in part, because pets are often frightened or made uncomfortable by tools used for grooming. Frightened pets may move erratically in an effort to escape the grooming procedure, and this erratic movement may be dangerous to the pet or the groomer. For example, the erratic movement by the pet may cause a cutting surface of the grooming tool to contact the pet or the groomer.

Furthermore, cutting or trimming pets' nails can be particularly challenging. Firstly, many pets prefer not to have their paws held. Because holding a pet's paws is necessary during a nail trim, this may cause increased stress to the pet. Additionally, trimming the pet's nail too far will cut the quick of the pet's nail. As in humans, cutting the quick of the pet's nail causes pain to the pet. Accordingly, the risk of causing harm to a pet may cause increased stress to the groomer during the nail trim.

Thus, it is desirable to perform the nail trimming as quickly and efficiently as possible to minimize the stress to both the pet and the groomer. However, the nail trimming procedure should not be rushed, as this increases the likelihood of accidentally trimming the quick of the pet's nail. One way to reduce the likelihood of cutting the quick of the pet's nail is to cut the nail at an angle. Another way to reduce the likelihood of cutting the quick of the nail is to control the distance of the nail from the cutting surface.

Electrically operated nail trimmers may help make the nail trimming procedure more accurate and more efficient. However, pets are often frightened by vibrations and sounds made by electrically operated grooming tools. Accordingly, there is a present need for an electrically operated nail trimmer, which enables trimming a pet's nail accurately and efficiently, that minimizes the stress to the pet and the groomer and reduces the likelihood of cutting the quick of the pet's nail.

SUMMARY

An attachment configured to be used with a hand-held rotary power tool has been developed. The attachment includes an attachment housing, a sanding disk, and a cap. The attachment housing includes a first portion and a second portion hingedly connected together so as to be rotatable between a first configuration and a second configuration. The attachment housing is substantially shaped as a hollow cylinder defining a cavity and is centered about a longitudinal axis when the first and second portions are in the second configuration. The sanding disk is positioned in the cavity of the attachment housing. The sanding disk has a substantially planar abrasive surface that is substantially circularly shaped and is configured to rotate about an axis of rotation. The axis of rotation is substantially parallel to the longitudinal axis. The cap is coupled to the first and second portions of the attachment housing. The cap is substantially shaped as a hollow cylinder including an end that is closed by an access portion and a guiding portion. The access portion defines an access surface that is substantially parallel to the abrasive surface of the sanding disk. The guiding portion defines a guiding surface that is not parallel to the abrasive surface of the sanding disk. The access portion includes an opening formed through the access surface and configured to provide access to the abrasive surface of the sanding disk when the cap is coupled to the attachment housing.

BRIEF DESCRIPTION OF THE DRAWINGS

FIG. 3A depicts a perspective view of an attachment housing of the attachment of FIGS. 1 and 2 in an open configuration.

FIG. 3B depicts a perspective view of the attachment housing of FIG. 3A in another open configuration.

FIG. 3C depicts a perspective view of the attachment housing of FIGS. 3A and 3B in a closed configuration.

FIG. 4A depicts a plan view of an inwardly facing side of a first portion of the attachment housing of FIGS. 3A-3C.

FIG. 4B depicts a plan view of an outwardly facing side of the first portion of the attachment housing of FIG. 4A.

FIG. 4C depicts a top view of the first portion of the attachment housing of FIG. 4A.

FIG. 4D depicts a cross-sectional bottom view of the first portion of the attachment housing of FIG. 4A cut along line D-D.

FIG. 4E depicts a partial cross-sectional view of a snap portion of the first portion of the attachment housing of FIG. 4A cut along line D-D.

FIG. 4F depicts a partial cross-sectional view of an engagement member of the first portion of the attachment housing of FIG. 4A cut along line D-D.

FIG. 5A depicts a plan view of an inwardly facing side of a second portion of the attachment housing of FIGS. 3A-3C.

FIG. 5B depicts a plan view of an outwardly facing side of the second portion of the attachment housing of FIG. 5A.

FIG. 5C depicts a top view of the second portion of the attachment housing of FIG. 5A.

FIG. 5D depicts a cross-sectional bottom view of the second portion of the attachment housing of FIG. 5A cut along line D-D.

FIG. 5E depicts a partial cross-sectional view of a snap portion of the second portion of the attachment housing of FIG. 5A cut along line D-D.

FIG. 5F depicts a partial cross-sectional view of a notch of the second portion of the attachment housing of FIG. 5A cut along line D-D.

FIG. 6 depicts a side perspective view of a cap of the attachment of FIGS. 1 and 2.

FIG. 7A depicts a cross-sectional side view of the cap of FIG. 6.

FIG. 7B depicts a top plan view of the cap of FIG. 6.

FIG. 7C depicts a side plan view of the cap of FIG. 6.

FIG. 7D depicts a cross-sectional bottom view of the cap of FIG. 6.

FIG. 7E depicts a partial cross-sectional view of a sliding tab of the cap of FIG. 6.

FIG. 8A depicts a perspective view of the cap of FIG. 6 aligned to be coupled to the attachment housing of FIGS. 3A-3C.

FIG. 8B depicts a perspective view of the cap of FIG. 6 coupled to the attachment housing of FIGS. 3A-3C.

FIG. 9 depicts a perspective view of a cap and attachment housing of the attachment of FIGS. 1 and 2.

FIG. 11A depicts a perspective view of an outwardly facing side of a first portion of the attachment housing of FIG. 10.

FIG. 11B depicts a plan view of the outwardly facing side of the first portion of the attachment housing of FIG. 11A.

FIG. 13A depicts a perspective view of the cap of FIG. 10.

FIG. 13B depicts a plan view of the cap of FIG. 13B.

FIG. 13C depicts a cross-sectional view of the cap of FIG. 13B cut along line C-C.

DETAILED DESCRIPTION

Figure 1:
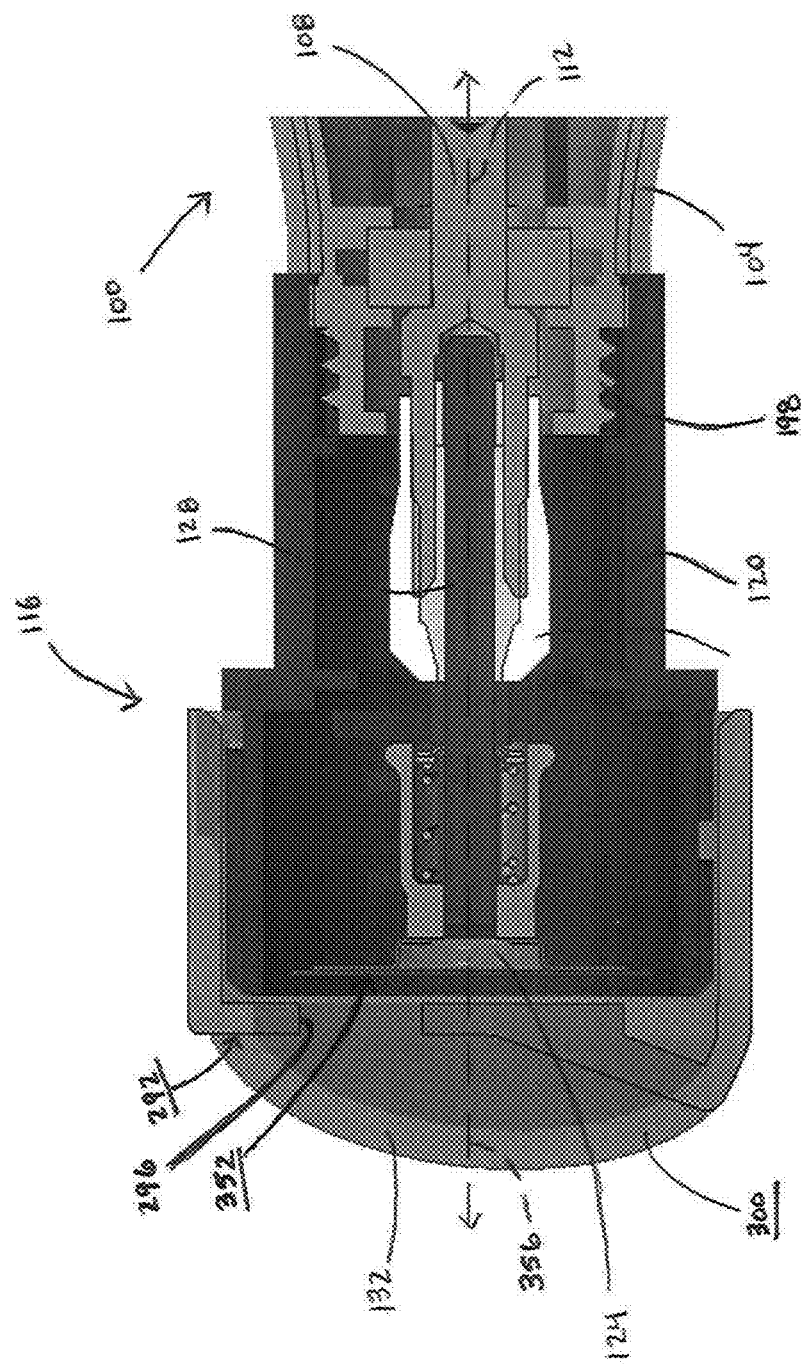
FIG. 1 depicts a partial cross-sectional view of a handheld rotary power tool and an attachment.
Figure 2:
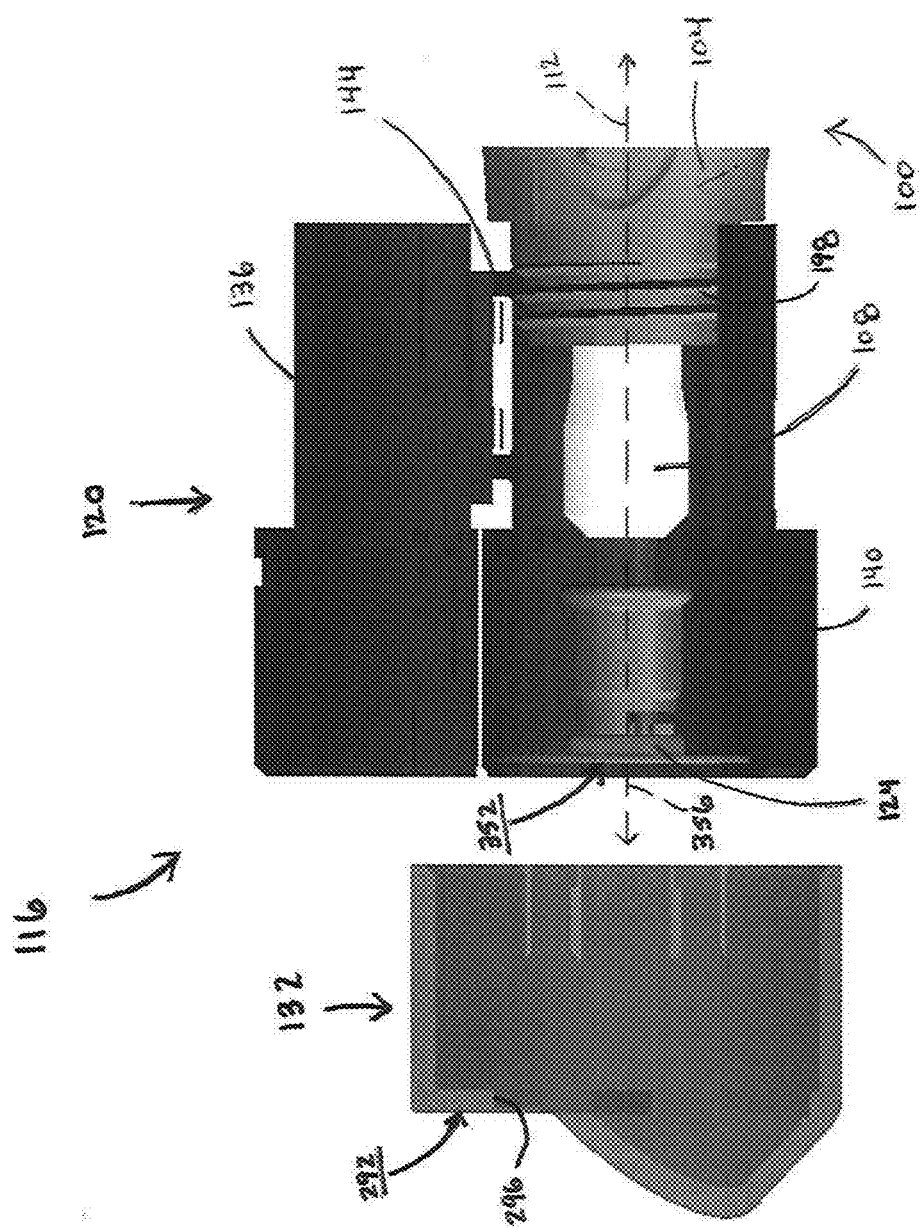
FIG. 2 depicts an exploded partial view of the handheld rotary power tool and attachment of FIG. 1.

As shown in FIGS. 1 and 2, a rotary power tool 100 includes a tool housing 104, which encloses a motor (not shown) configured to electrically operate a mandrel 108 to rotate about a tool axis 112. The mandrel 108 is configured to interchangeably receive various attachments configured to perform different processes on different surfaces and workpieces, including the attachment 116. As described in more detail below, the attachment 116 of the present disclosure is configured to trim pet nails. The attachment 116 includes an attachment housing 120 configured to be coupled to the tool housing 104, a sanding disk 124 coupled to a spindle 128, which is configured to be received by the mandrel 108, and a cap 132, which is configured to be coupled to the attachment housing 120 to partially cover the sanding disk 124. As described in more detail below, the attachment housing 120 is movable between an open configuration and a closed configuration to selectively provide access to an interior of the attachment housing 120. The sanding disk 124 is rotatable to perform a sanding process on pet nails, and the cap 132 is configured to provide limited, guided access to the sanding disk 124 when the sanding disk 124 is positioned within the attachment housing 120 and the cap 132 is coupled to the attachment housing 120.

As shown in FIGS. 3A-3C, the attachment housing 120 includes a first portion 136 and a second portion 140, which are coupled together by a hinge 144 such that the first portion 136 and second portion 140 are rotatable relative to one another. The first portion 136 includes contact surfaces 148 configured to selectively contact complementarily shaped contact surfaces 152 of the second portion 140. When the first portion 136 and the second portion 140 are arranged such that the contact surfaces 148 are not in contact with the contact surfaces 152, the attachment housing 120 is in the open configuration (also referred to herein as the "first configuration"). As shown in FIG. 3B, the first and second portions 136, 140 are rotatable about the hinge 144 such that the contact surfaces 148, 152 are brought toward one another. As shown in FIG. 3C, when the first portion 136 and the second portion 140 are arranged such that the contact surfaces 148, 152 are in contact with one another, the attachment housing 120 is in the closed configuration (also referred to herein as the "second configuration").

As shown in FIG. 3C, when the attachment housing 120 is in the second configuration, the attachment housing 120 is substantially shaped as a hollow cylinder defining a cavity 156 and being centered about a longitudinal axis 160. When the attachment housing 120 is coupled to the tool housing 104, as shown in FIGS. 1 and 2, the longitudinal axis 160 is substantially parallel to the tool axis 112. In at least some embodiments, when the attachment housing 120 is coupled to the tool housing 104, the longitudinal axis 160 is substantially coaxial with the tool axis 112.

The first portion 136 of the attachment housing 120 is shown in more detail in FIGS. 4A-4F. The first portion 136 includes a concave inwardly facing side 164 (shown in FIG. 4A) opposite a convex outwardly facing side 168 (shown in FIG. 4B). The contact surfaces 148 are formed on the inwardly facing side 164. The first portion 136 also includes an attachment end portion 172 configured to face toward the tool housing 104 when the attachment housing 120 is coupled to the tool housing 104. The first portion 136 also includes a cap end portion 176 opposite the attachment end portion 172 and configured to be received within the cap 132, as explained in more detail below. The attachment end portion 172 extends from the cap end portion 176 to an attachment end 174, and the cap end portion 176 extends from the attachment end portion 172 to a cap end 178.

Similarly, the second portion 140 of the attachment housing 120 is shown in more detail in FIGS. 5A-5F. Like the first portion 136, the second portion 140 includes a concave inwardly facing side 180 (shown in FIG. 5A) opposite a convex outwardly facing side 184 (shown in FIG. 5B), and the contact surfaces 152 are formed on the inwardly facing side 180. The second portion 140 also includes an attachment end portion 188 configured to face toward the tool housing 104 when the attachment housing 120 is coupled to the tool housing 104. The second portion 140 also includes a cap end portion 192 opposite the attachment end portion 188 and configured to be received within the cap 132, as explained in more detail below. The attachment end portion 188 extends from the cap end portion 192 to an attachment end 190, and the cap end portion 192 extends from the attachment end portion 188 to a cap end 194.

Each of the first and second portions 136, 140 includes threads 196 formed on the respective inwardly facing side 164, 180 in the respective attachment end portion 172, 188. When the attachment housing 120 is in the second configuration, the threads 196 of the first portion 136 abut the threads 196 of the second portion 140 and cooperate to enable the attachment housing 120 to threadably engage mating threads 198 (shown in FIGS. 1 and 2) formed on the tool housing 104 to securely and removably fasten the attachment housing 120 to the tool housing 104.

Each of the first and second portions 136, 140 also includes a channel 200 formed as a depression in the respective outwardly facing side 168, 184 in the respective cap end portion 176, 192 and configured to selectively engage the cap 132, as described in more detail below. Each of the channels 200 includes a trunk 204 extending from the respective cap end 178, 194 toward the respective attachment end portion 172, 188. The trunks 204 are formed substantially perpendicularly to the respective cap ends 178, 194 and have a width W and a length L. Each of the channels 200 also includes a first branch 208, which is spaced apart from the cap end 178, 194 by the length L, and a second branch 212, which is spaced apart from the cap end 178, 194 by approximately half of the length L.

The first branches 208 of the channels 200 extend wider than the width W of the trunks 204 in a first direction (indicated by arrow D1 in FIGS. 4B and 5B) around the cap end portions 176, 192, and the second branches 212 of the channels 200 extend wider than the width W of the trunks 204 in a second opposite direction (indicated by arrow D2 in FIGS. 4B and 5B) around the cap end portions 176, 192. The channels 200 are formed to mirror one another such that when the attachment housing 120 is in the second configuration, forming the hollow cylinder, the first direction D1, in which the first branches 208 extend, is the same direction circumferentially around the attachment housing 120 and the second direction D2, in which the second branches 212 extend, is the same direction circumferentially around the attachment housing 120.

As shown in FIGS. 4A-4D, the first portion 136 of the attachment housing 120 includes a snap portion 216 coupled to the attachment end portion 172. The snap portion 216 includes three C-shaped cups 220A, 220B, and 220C coupled to the attachment end portion 172 by a tab 224 such that the cups 220A, 220B, 220C extend away from the attachment end portion 172. As shown in more detail in FIG. 4E, each of the C-shaped cups 220A, 220B, 220C includes an opening 228. Two of the C-shaped cups 220A, 220C are arranged such that the openings 228 are open toward the inwardly facing side 164 of the first portion 136. A third C-shaped cup 220B, interposed between the other two C-shaped cups 220A, 220C, is arranged in the opposite direction such that the opening 228 is open toward the outwardly facing side 168 of the first portion 136. The openings 228 of all three of the C-shaped cups 220A, 220B, 220C partially overlap one another to form a snap openings 230. FIG. 4E depicts the opening 228 of the third of the C-shaped cups 220B and the opening 228 of one of the other two C-shaped cups 220A overlapping to form the snap opening 230.

As shown in FIGS. 5A-5D, the second portion 140 of the attachment housing 120 includes a snap portion 232 coupled to the attachment end portion 188. The snap portion 232 includes a rod 236 coupled to the attachment end portion 188 by tabs 240 such that the rod 236 is spaced apart from the outwardly facing side 184 of the second portion 140. The rod 236 is substantially cylindrically shaped and is arranged such that a longitudinal axis 244 of the rod 236 is substantially parallel to the longitudinal axis 160 (shown in FIG. 3C). For clarity, a cross-sectional view of a portion of the snap portion 232 including the rod 236 is shown in more detail in FIG. 5E.

The cups 220A, 220B, 220C of the first portion 136 are sized and configured to receive the rod 236 of the second portion 140 via the snap opening 230. The cups 220 and the rod 236 are configured to be snap-fitted together. Accordingly, the snap opening 230 is slightly smaller than a diameter of the rod 236, and the cups 220 are configured to flex slightly to allow the rod 236 to pass through the snap opening 230. Once snapped into the cups 220, the rod 236 is rotatable within the cups 220 such that the snap portion 216 of the first portion 136 and the snap portion 232 of the second portion 140 cooperate to form the hinge 144 (shown in FIGS. 2, 3A, and 3B). Accordingly, the first and second portions 136, 140 are rotatable relative to one another about the longitudinal axis 244 of the rod 236.

As shown in FIGS. 4C and 4D, the first portion 136 further includes an engagement member 248 extending from the contact surface 148 at the attachment end portion 172 and generally arranged opposite the snap portion 216. As shown in more detail in FIG. 4F, the engagement member 248 includes a leg 252 and a head 256. The leg 252 extends substantially perpendicularly from the contact surface 148 and is substantially flush with the outwardly facing side 168 of the first portion 136. The head 156 extends from the leg 252 on an end opposite where the leg 252 meets the contact surface 148 and is angled back toward the inwardly facing side 164 of the first portion 136.

The leg 252 is elastically flexible to enable selective movement of the head 256 toward and away from the inwardly facing side 164 of the first portion 136. In a neutral position, in which no force is being applied to the engagement member 248, the elastic leg 252 is substantially perpendicular to the contact surface 148. When a force having a component that directed parallel to the contact surface 148 is applied to the engagement member 248, the elastic leg 252 is moved such that it is not substantially perpendicular to the contact surface 148, which moves the head 256 toward and away from the inwardly facing side 164.

As shown in FIGS. 5B and 5D, the second portion 140 further includes a notch 260 formed in the outwardly facing side 184 of the attachment end portion 188 and sized and configured to engage the engagement member 248 such that the engagement member 248 is disposed on the outwardly facing side 184 of the second portion 140. As shown in more detail in FIG. 5F, the notch 260 includes an engagement face 264 formed in the outwardly facing side 184 and substantially parallel to the contact surface 152. The engagement face 264 is sized and configured to catch the head 256 of the engagement member 248 to securely and removably retain the attachment housing 120 in the second configuration, as is shown in FIG. 3C.

To retain the attachment housing 120 in the second configuration, the contact surfaces 148, 152 are brought toward one another, such that the engagement member 248 is received in the notch 260. When the engagement member 248 is received in the notch 260, the head 256 of the engagement member 248 contacts the outwardly facing side 184 of the second portion 140 such that a force is applied to the engagement member 248 having a component in a direction parallel to the contact surface 148 of the first portion 136. Thus, the leg 252 is flexed away from the inwardly facing side 164 of the first portion 136 until the head 256 passes over the engagement face 264. Once the head 256 passes over the engagement face 264, the leg 252 is free to flex toward the inwardly facing side 164 of the first portion 136 and return to the neutral position. The head 256 is then caught on the engagement face 264 to retain the attachment housing 120 in the second configuration. To release the attachment housing 120 from the second configuration, the head 256 is lifted and the leg 252 is flexed away from the inwardly facing side 164 of the first portion 136, such that the head 256 is removed from engagement with the engagement face 264. Once the head 256 is no longer caught on the engagement face 264, the first portion 136 and the second portion 140 are free to rotate to separate the contact surfaces 148, 152 from one another.

As shown in FIG. 4A, the first portion 136 includes rims 268 formed as depressions in each of the contact surfaces 148 and the inwardly facing side 164 and following the contour of the contact surfaces 148 and the inwardly facing side 164. The rims 268 extend partially along the attachment end portion 172 and the cap end portion 176, but do not extend to the attachment end 174 or the cap end 178. As shown in FIG. 5A, the second portion 140 includes lips 272 extending outwardly from each of the contact surfaces 152 and flush with the inwardly facing side 180 and following the contour of the contact surfaces 152 and the inwardly facing side 180. The lips 272 are sized and configured to be received within the rims 268 of the first portion 136 when the contact surfaces 148, 152 are in contact with one another and the attachment housing 120 is in the second configuration. The rims 268 and lips 272 help guide the first portion 136 and the second portion 140 together and further help retain the attachment housing 120 in the second configuration.

As shown in FIG. 6, the cap 132 is shaped substantially as a hollow cylinder centered about a cap axis 274 and having a cap diameter 275. When the cap 132 is coupled to the attachment housing 120, as shown in FIGS. 1 and 2, the cap axis 274 is substantially parallel to the longitudinal axis 160 of the attachment housing 120. In at least one embodiment, the cap axis 274 is substantially coaxial with the longitudinal axis 160. Accordingly, when the cap 132 is coupled to the tool housing 104 via the attachment housing 120, the cap axis 274 is substantially parallel to the tool axis 112, and, in at least one embodiment, is substantially coaxial with the tool axis 112.

FIGS. 7A-7E show the cap 132 in more detail. As shown in FIGS. 6 and 7A, the cap 132 has an inner circumferential surface 276 (indicated by an arrow in FIG. 6) opposite an outer circumferential surface 280. The cap 132 also has a first end 278 and a second end 282, which is opposite the first end 278 and is separated from the first end 278 by the inner and outer circumferential surfaces 276, 280. The first end 278 is open, and the second end 282 is closed by an access portion 284 and a guiding portion 288 (shown in FIG. 6).

As shown in FIGS. 6 and 7B the access portion 284 includes an access surface 292 and an access opening 296 formed in the access surface 292. The access surface 292 is a substantially planar surface arranged substantially perpendicular to the cap axis 274 and is shaped substantially as a semicircle extending from the outer circumferential surface 280 to the cap diameter 275. The access opening 296 is formed through the access surface 292 and, when the cap 132 is coupled to the attachment housing 120, provides access through the cap 132 into the attachment housing 120.

Like the access surface 292, the access opening 296 is also shaped substantially as a semicircle. However, the access opening 296 has an opening diameter 298 that is smaller than the cap diameter 275. Accordingly, the access opening 296 is smaller than the access surface 292. In at least one embodiment, the cap diameter 275 is between approximately 34 and 36 mm, and the opening diameter 298 is between approximately 20 and 22 mm. The opening diameter 298 is arranged parallel to and offset from the cap diameter 275 such that the access opening 296 is surrounded by the access surface 292.

As shown in FIGS. 6 and 7C, the guiding portion 288 includes a guiding surface 300 and a dome surface 304. The guiding surface 300 is a substantially planar surface and extends outwardly from the access surface 292 at an angle A away from the cap axis 274 and the first end 278 of the cap 132. In at least one embodiment, the angle A is between approximately 30° and approximately 60°. In a preferred embodiment, the angle A is approximately 45°. The guiding portion 288 is also substantially shaped as a semicircle extending from the cap diameter 275 to an uppermost edge 308. Thus, the uppermost edge 308 is substantially shaped as a 180° arc extending from the cap diameter 275. The dome surface 304 is a partial substantially dome shaped surface extending from the uppermost edge 308 to the outer circumferential surface 280.

As shown in FIGS. 6, 7A, 7C, and 7D, the cap 132 includes two sliding tabs 312 formed on opposite sides of the cap 132. As shown in FIG. 6, each of the sliding tabs 312 includes a leg 316 having a first end 320 and a second end 324. The first end 320 of each of the legs 316 is integrally formed with the cap 132, and the second end 324 of each of the legs 316 is separated from the cap 132 by slots 328 on either side of each leg 316. The slots 328 are formed through the inner and outer circumferential surfaces 276, 280 such that the second end 324 of each of the legs 316 is free from the cap 132. As shown in FIG. 7A, each of the legs 316 is flush with the outer circumferential surface 280. However, each of the legs 316 is thinner than the cap 132 such that the legs 316 are not flush with the inner circumferential surface 276. In other words, the inner circumferential surface 276 extends farther inwardly from the outer circumferential surface 280 toward the cap axis 274 than do the legs 316.

The second end 324 of each of the legs 316 is substantially flush with the first end 278 of the cap 132 and includes a projection 332 extending substantially perpendicularly to the outer circumferential surface 280 toward the cap axis 274. Each of the projections 332 is also substantially flush with the first end 278. The projections 332 extend farther inwardly from the outer circumferential surface 280 toward the cap axis 274 than does the inner circumferential surface 276. Thus, the projections 332 are not flush with the inner circumferential surface 276.

As shown in FIG. 7E, each of the projections 332 includes a detent projection 336 formed facing toward the cap axis 274 and extending farther inwardly from the outer circumferential surface 280 toward the cap axis 174 than does the area of the projection 332 surrounding the detent projection 336. The legs 316 are elastically flexible to enable selective movement of the projections 332 toward and away from the cap axis 274. In a neutral position, in which no force is being applied to the legs 316, the legs 316 are substantially flush with the outer circumferential surface 280. When a force having a component that is substantially perpendicular to the cap axis 274 is applied to one of the legs 316, the leg 316 is moved such that it is not substantially flush with the outer circumferential surface 280, which moves the projection 332, and the detent projection, toward and away from the cap axis 274.

As shown in FIGS. 8A and 8B, the cap 132 can be coupled to the attachment housing 120 when the attachment housing 120 is in the second configuration. To couple the cap 132 to the attachment housing 120, the cap 132 is aligned with the attachment housing 120 such that each of the sliding tabs 312 is aligned with the trunk 204 of one of the channels 200. The width W of the trunk 204 of each of the channels 200 is wide enough to enable each of the projections 332 to slide along the length L of the respective trunk 204. The cap end portions 176, 192 of the first and second portions 136, 140 are then inserted into the first end 278 of the cap 132, the inner circumferential surface 276 of the cap 132 is slid onto the outwardly facing sides 168, 184 of the first and second portions 136, 140, and the sliding tabs 312 are slid along the trunks 204 of the channels 200. Accordingly, the cap 132 cannot be coupled to the attachment housing 120 when the attachment housing 120 is not in the second configuration.

The sliding tabs 312 of the cap 132 and the channels 200 of the attachment housing 120 cooperate to form a height adjustment mechanism 340, which enables the cap 132 to be adjustable relative to the attachment housing 120 between a lower position and a higher position. When the projections 332 are arranged in the trunks 204 at a position laterally aligned with the first branches 208, the cap 132 is rotatable in the first direction D1 relative to the attachment housing 120 to enable the projections 332 to slide into the first branches 208. As the projections 332 slide into the first branches 208, humps 344 formed in the first branches 208 contact the detent projections 336 and apply a force having a component in a direction perpendicular to the cap axis 274 to the legs 316. Thus, the detent projections 336 are moved away from the cap axis 274 to pass over the humps 344 as the cap 132 is rotated in the first direction D1. Once the detent projections 336 have passed over the humps 344, the legs 316 are free to return to the position flush with the outer circumferential surface 280 of the cap 132, and the detent projections 336 are received in the first branches 208 of the channels 200 to retain the cap 132 in the lower position relative to the attachment housing 120. The cap 132 is shown in the lower position in FIG. 8B.

To adjust the cap 132 from the lower position to the higher position, the cap 132 is first rotated in the second direction D2. As the projections 332 contact the humps 344, the detent projections 336 are moved away from the cap axis 274 to pass over the humps 344. Once the detent projections 336 have passed over the humps 344, the legs 316 are free to return to the position flush with the outer circumferential surface 280 of the cap 132, and the detent projections 336 are again received in the trunks 204 of the channels 200. The cap 132 can then be moved away from the attachment housing 120 by sliding the projections 332 in the trunks 204 along the cap axis 274.

When the projections 332 are arranged in the trunks 204 at a position laterally aligned with the second branches 212, the cap 132 is rotatable further in the second direction D2 relative to the attachment housing 120 to enable the projections 332 to slide into the second branches 212. As the projections 332 slide into the second branches 212, humps 348 formed in the second branches 212 contact the detent projections 336 and apply a force having a component in a direction perpendicular to the cap axis 274 to the legs 316. Thus, the detent projections 336 are moved away from the cap axis 274 to pass over the humps 348 as the cap 132 is rotated in the second direction D2. Once the detent projections 336 have passed over the humps 348, the legs 316 are free to return to the position flush with the outer circumferential surface 280 of the cap 132, and the detent projections 336 are received in the second branches 212 of the channels 200 to retain the cap 132 in the higher position relative to the attachment housing 120.

Returning now to FIGS. 1 and 2, the sanding disk 124 includes a substantially planar abrasive surface 352 that is substantially circularly shaped and is arranged substantially perpendicularly relative to the tool axis 112 when the attachment 116 is coupled to the tool 100. The abrasive surface 352 can be, for example, a 60 grit surface. The abrasive surface 352 has a diameter arranged perpendicular to the tool axis 112 that is larger than the opening diameter 298 such that the abrasive surface 352 and the sanding disk 124 cannot fit through the access opening 296 in the cap 132. For example, the abrasive surface 352 can have a diameter of 22.5 mm. The sanding disk 124 is configured to rotate about an axis of rotation 356, about which the abrasive surface 352 is centered. The axis of rotation 356 is substantially parallel to the tool axis 112 when the attachment 116 is coupled to the tool 100. In at least one embodiment, the axis of rotation 356 is substantially coaxial with the tool axis 112 when the attachment 116 is coupled to the tool 100.

The sanding disk 124 is coupled to the spindle 128 (shown in FIG. 1) such that the abrasive surface 352 faces away from the spindle 128. In other words, the spindle 128 and the abrasive surface 352 are arranged on opposite sides of the sanding disk 124. In at least one embodiment, the spindle 128 is an EZLock™ spindle to facilitate easily removing and replacing the sanding disk 124.

To couple the attachment 116 to the tool 100, the sanding disk 124 is coupled to the spindle 128, and the spindle 128 is coupled to the mandrel 108. The sanding disk 124 and the spindle 128 are then partially covered for safe operation of the tool 100 by coupling the attachment housing 120 and cap 132 to the tool housing 104. First, the attachment housing 120 is arranged in the second position to form the cavity 156 (shown in FIG. 3C) in the manner described above. The attachment housing 120 is then coupled to the tool housing 104 by threadably engaging the threads 196 on the attachment housing 120 with the threads 198 on the tool housing 104 such that the sanding disk 124 is received within the cavity 156. The cap 132 is configured to be slidingly coupled to the attachment housing 120, either before or after the attachment housing 120 has been coupled to the tool housing 104, in the manner described above.

When the sanding disk 124 has been coupled to the mandrel 108 via the spindle 128, and the cap 132 has been coupled to the tool housing 104 via the attachment housing 120, the attachment 116 has been coupled to the tool 100. When the attachment 116 has been coupled to the tool 100, the access surface 292 of the cap 132 is substantially parallel to the abrasive surface 352 of the sanding disk 124. Accordingly, the guiding surface 300 of the cap 132 is not substantially parallel to the abrasive surface 352 of the sanding disk 124. The access opening 296 in the access portion 284 of the cap 132 provides access to the abrasive surface 352 of the sanding disk 124. In other words, the cap 132 partially covers the sanding disk 124.

When the tool 100 is operated, rotation of the mandrel 108 by the motor (not shown) rotates the spindle 128 and the sanding disk 124 about the tool axis 112. Accordingly, the abrasive surface 352 is also rotated about the tool axis 112. To use the tool 100 and attachment 116 to trim a pet nail, a user holds the tool 100 and attachment 116 in one hand and holds the pet's paw in the other hand. The user brings the pet's paw into contact with the cap 132 such that the paw is resting on the guiding surface 300 of the guiding portion 288 of the cap 132. Thus, the paw is arranged at the angle A (shown in FIG. 7C) relative to the access surface 292 and, accordingly, relative to the abrasive surface 352 of the sanding disk 124. The pet's nail is then inserted through the access opening 296 to bring the pet's nail into contact with the abrasive surface 352 of the sanding disk 124. The pet's nail is then abraded by contact with the abrasive surface 352, and removal of material from the pet's nail trims the pet's nail.

The arrangement of the guiding surface 300 at the angle A relative to the access surface 292 and the abrasive surface 352 facilitates trimming the pet's nail at an angle. Additionally, by surrounding the access opening 296, the access surface 292 helps prevent the pet's nail from being inserted too far into the cap 132 and too much of the pet's nail being trimmed off. Accordingly, the cap 132 of the attachment 116 is configured to help reduce the likelihood of cutting the quick of the pet's nail during a nail trimming procedure.

The attachment 116 is configured to be used on a variety of tools, between which the position of the mandrel 108 in the tool housing 104 may vary along the tool axis 112. Accordingly, when the attachment 116 is coupled to the different tools, the distance of the spindle 128 and sanding disk 124 relative to the access surface 292 of the cap 132 may vary along the tool axis 112. The amount of the pet's nail which is trimmed depends, in part, on the distance between the access surface 292 of the cap 132 and the abrasive surface 352 of the sanding disk 124. Accordingly, to adjust the distance between the access surface 292 and the abrasive surface 352 when the arrangement of the mandrel 108 in the tool housing 104 varies along the tool axis 112, the cap 132 can be adjusted relative to the attachment housing 120 via the height adjustment mechanism 340 in the manner described above. For example, to increase the distance between the access surface 292 and the abrasive surface 352, the height adjustment mechanism 340 can be used to adjust the cap 132 to the higher position. Conversely, to decrease the distance between the access surface 292 and the abrasive surface 352, the height adjustment mechanism 340 can be used to adjust the cap 132 to the lower position.

As shown in FIG. 9, in at least one embodiment, the cap 132 can be made of a material which is at least substantially transparent to facilitate viewing the sanding disk 124 (shown in FIGS. 1 and 2) within the attachment housing 120 when the attachment 116 is coupled to the tool 100.

Figure 10:
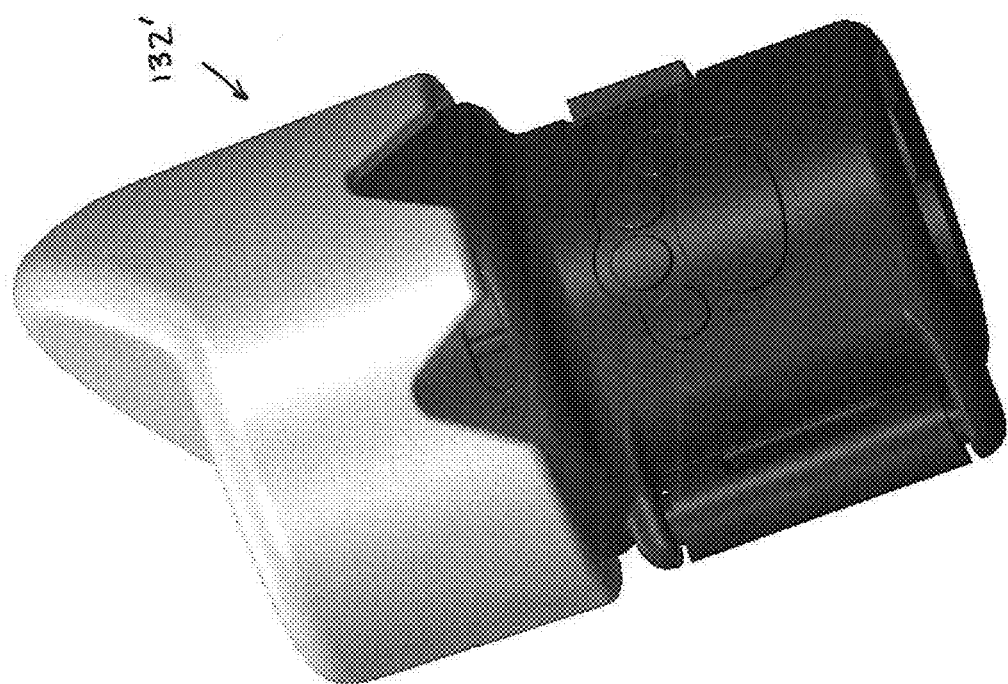
FIG. 10 depicts a perspective view of an alternative embodiment of an attachment to be used with the handheld rotary power tool of FIG. 1 including an attachment housing and a cap.

FIG. 10 depicts an alternative embodiment of an attachment 116' configured to be used with the handheld rotary power tool 100 shown in FIG. 1 in the same manner as the attachment 116, shown in FIGS. 1-9 and described above. Thus, the attachment 116' is substantially similar to attachment 116 in structure and function and includes an attachment housing 120' and a cap 132', which are substantially similar in structure and function to the attachment housing 120 and the cap 132 shown in FIGS. 1-9 and described above. The attachment housing 120' and the cap 132' of the attachment 116' differ from those of the attachment 116, however, in the manner described in more detail below.

FIG. 11A depicts a perspective view of an outwardly facing side 168' of the first portion 136' of the attachment housing 120'. The first portion 136' includes channel 200' formed as a depression in the cap end portion 176' and configured to selectively engage the cap 132' as described in more detail below. As shown more clearly in FIG. 11B, the channel 200' includes a trunk 204' and branches 208', 210', and 212'. The trunk 204' extends from the cap end 178' toward the attachment end portion 172' of the first portion 136' and includes a first portion 204A', a second portion 204B', and a third portion 204C', which are angled relative to one another and are angled relative to the cap end 178' such that the trunk 204' is not substantially perpendicular relative to the cap end 178'. The first portion 204A' and the third portion 204C' extend in a first angular direction (indicated by arrow AD1'), and the second portion 204B' extends in a second angular direction (indicated by arrow AD2') that is substantially perpendicular to the first angular direction.

The first branch 208' is spaced apart from the cap end 178' and extends in the first direction (indicated by arrow D1') from the first portion 204A' of the trunk 204' near or at the position where the first portion 204A' meets the second portion 204B'. The first direction D1' is approximately parallel to the cap end 178' and is oriented approximately 45° relative to the first and second angular directions AD1', AD2'. The second branch 210' is arranged farther from the cap end 178' than is the first branch 208', and the second branch 210' extends in the second direction (indicated by arrow D2') from the second portion 204B' of the trunk 204'. The second direction D2' is opposite the first direction D1' and is thus also approximately parallel to the cap end 178'. The third branch 212' is arranged farther from the cap end 178' than is the second branch 210', and the third branch 212' extends in the first direction D1' from the third portion 204C' of the trunk 204'. Thus, the third branch 212' extends in the same direction as the first branch 208'.

Returning to FIG. 11A, the first portion 136' of the attachment housing 120' also includes a snap portion 216' coupled to the attachment end portion 172'. The snap portion 216' includes a C-shaped cup 220' coupled to the attachment end portion 172' by tabs 224' such that the cup 220' extends away from the attachment end portion 172'. The cup 220' includes an opening 228' arranged to be open toward the outwardly facing side 168' of the first portion 136'. The snap portion 216' also includes a detent face 230' extending from the outwardly facing side 168' of the first portion 136' and facing toward the opening 228'.

Figure 12B:
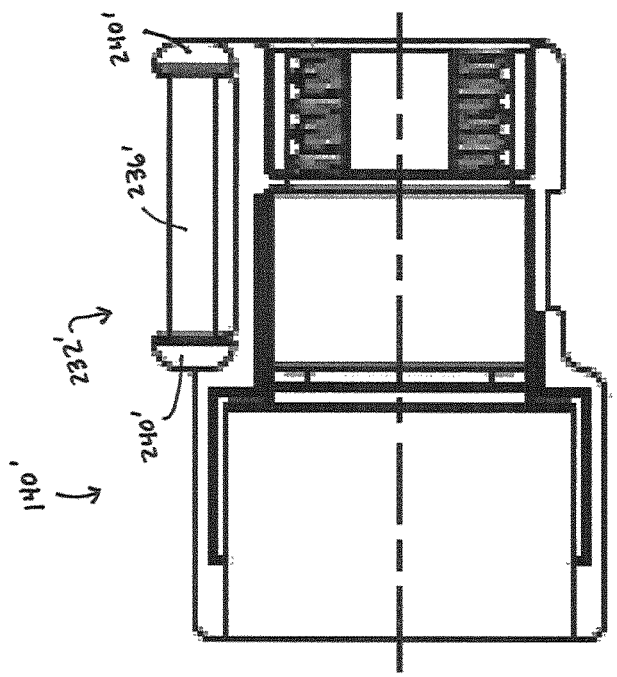
FIG. 12B depicts a plan view of the outwardly facing side of the second portion of the attachment housing of FIG. 12A.
Figure 12A:
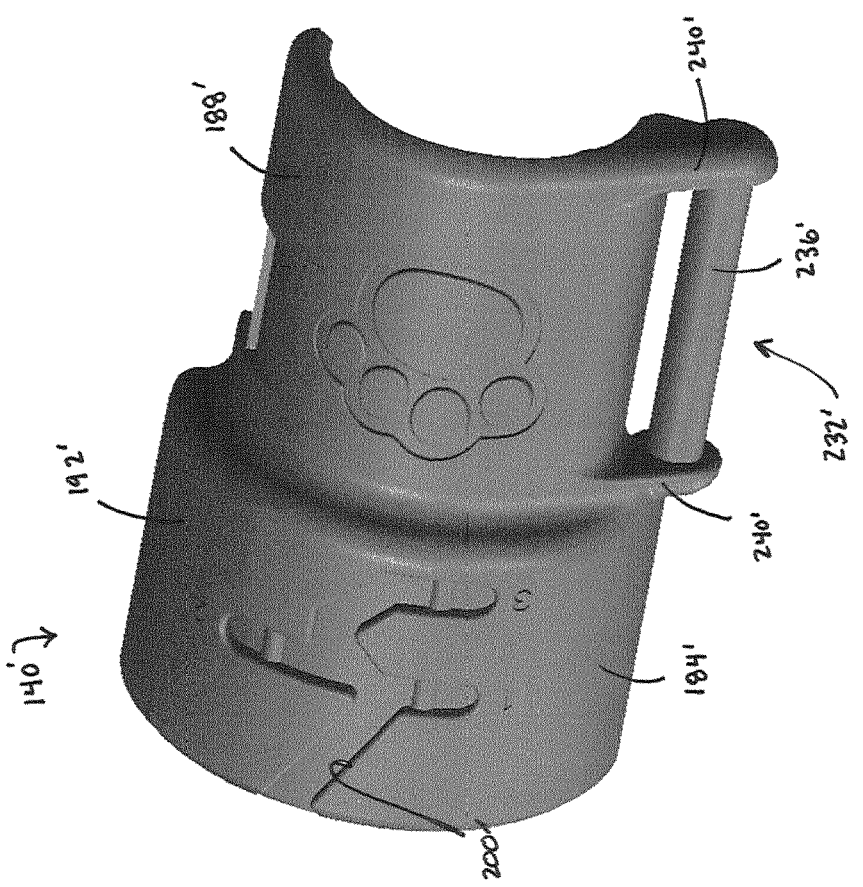
FIG. 12A depicts a perspective view of an outwardly facing side of a second portion of the attachment housing of FIG. 10.

FIG. 12A depicts a perspective view of an outwardly facing side 184' of the second portion 140' of the attachment housing 120'. The second portion 140' includes channel 200' formed as a depression in the cap end portion 192' and configured to selectively engage the cap 132' as described in more detail below. The channel 200' is substantially similar to the channel 200' formed in the first portion 136', shown in FIGS. 11A and 11B and described above. The channels 200' formed in the first and second portions 136', 140' are formed to mirror one another such that when the attachment housing 120' is in the closed configuration, as shown in FIG. 10, the first direction D1' is the same direction circumferentially around the attachment housing 120' and the second direction D2' is the same direction circumferentially around the attachment housing 120'. Similarly, the first angular direction AD1' is the same direction circumferentially around the attachment housing 120' and the second angular direction AD2' is the same direction circumferentially around the attachment housing 120'.

As shown in FIGS. 12A and 12B, the second portion 140' of the attachment housing 120' also includes a snap portion 232' coupled to the attachment end portion 188'. The snap portion 232' includes a rod 236' coupled to the attachment end portion 188' by tabs 240' such that the rod 236' is spaced apart from the outwardly facing side 184' of the second portion 140'. The rod 236' is substantially cylindrically shaped and is sized and configured to be received by a snap-fit in the snap portion 216' of the first portion 136'. More specifically, the rod 236' is inserted into the snap portion 216' by sliding the rod 236' between the detent face 230' and the cup 220'. At least one of the rod 236', the cup 220' and the detent face 230' is configured to flex slightly to pass the rod 236' into the opening 228'. Once received within the opening 228', the rod 236' is rotatably retained in the snap portion 216' by the detent face 230' and the cup 220' such that the first portion 136' and the second portion 140' are hingedly connected.

FIG. 13A depicts a perspective view of the cap 132'. The cap 132' includes sliding tabs 312' on opposite sides of the cap 132'. Only one sliding tab 312' is visible in FIG. 13A. Each of the sliding tabs 312' includes a leg 316' having a first end 320', which is integrally formed with the cap 132', and a second end 324', which is separated from the cap 132' by slots 328' on either side of each leg 316'.

As shown more clearly in FIG. 13B, each slot 328' is substantially triangularly shaped with a base of the triangle oriented along the first end 278' of the cap 132' and an apex of the triangle extending into the cap 132' in a direction toward the second end 282' of the cap 132'.

FIG. 13C depicts a cross-section of the cap 132' cut along the line C-C. As shown in FIG. 13C, each of the legs 316' includes a projection 332' extending substantially perpendicularly from the inner circumferential surface 276' in a direction toward the cap axis 274'. Each of the projections 332' includes a detent projection 336' formed facing toward the cap axis 274' and extending farther inwardly than does the area of the projection 332' surrounding the detent projection 336'. Each detent projection 336' is spaced apart from the first end 278' of the cap 132'.

As shown in FIG. 10, the cap 132' is coupled to the attachment housing 120' when the attachment housing 120' is in the second configuration. To couple the cap 132' to the attachment housing 120', the cap 132' is aligned with the attachment housing 120' such that each of the sliding tabs 312' is aligned with the first portion 204A' of the trunk 204' of one of the channels 200'. The cap end portions 176', 192' of the first and second portions 136', 140' are then inserted into the first end 278' of the cap 132', and the projections 332' formed on the legs 316' are slid along the first portions 204A' of the trunks 204' of the channels 200'.

The sliding tabs 312' of the cap 132' and the channels 200' of the attachment housing 120' cooperate to form a height adjustment mechanism 340', which enables the cap 132' to be adjustable relative to the attachment housing 120' between a first position, wherein the sliding tabs 312' are received within the first branches 208', a second position, wherein the sliding tabs 312' are received within the second branches 210', and a third position, wherein the sliding tabs 312' are received within the third branches 212' of the channels 200'. The projections 332' are slidable along the first, second, and third portions 204A', 204B', and 204C' and are selectively retainable within each of the first, second, and third branches 208', 210', and 212'.

The foregoing detailed description of one or more embodiments of the attachment configured to be used with a hand-held rotary power tool has been presented herein by way of example only and not limitation. It will be recognized that there are advantages to certain individual features and functions described herein. Moreover, it will be recognized that various alternatives, modifications, variations, or improvements of the above-disclosed embodiments and other features and functions, or alternatives thereof, may be desirably combined into many other different embodiments, systems, or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An attachment configured to be used with a hand-held rotary power tool, the attachment comprising:
an attachment housing including a first portion and a second portion configured to be hingedly connected together so as to be rotatable between a first configuration and a second configuration, the attachment housing being substantially shaped as a hollow cylinder defining a cavity and being centered about a longitudinal axis when the first and second portions are in the second configuration;
a sanding disk configured to be positioned in the cavity of the attachment housing, the sanding disk having a substantially planar abrasive surface that is substantially circularly shaped and is configured to rotate about an axis of rotation, the axis of rotation being substantially parallel to the longitudinal axis; and
a cap configured to be coupled to the first and second portions of the attachment housing, the cap being substantially shaped as a hollow cylinder including an end that is closed by an access portion and a guiding portion, the access portion defining an access surface that is substantially parallel to the abrasive surface of the sanding disk, the guiding portion defining a guiding surface that is not parallel to the abrasive surface of the sanding disk, the access portion including an opening formed through the access surface and configured to provide access to the abrasive surface of the sanding disk when the cap is coupled to the attachment housing.

2. The attachment of claim 1, wherein:
the attachment housing includes at least one channel; and
the cap includes at least one sliding tab configured to be slidably received in the at least one channel.

3. The attachment of claim 2, wherein:
the at least one channel includes a trunk, a first branch, and a second branch; and
the at least one sliding tab is configured to be slidably received in the trunk and selectively rotatable into the first branch and the second branch.

4. The attachment of claim 3, wherein:
when the at least one sliding tab is rotated into the first branch, the access surface is spaced apart from the abrasive surface of the sanding disk by a first distance; and
when the at least one sliding tab is rotated into the second branch, the access surface is spaced apart from the abrasive surface of the sanding disk by a second distance that is different than the first distance.

5. The attachment of claim 1, wherein the guiding surface is arranged at an angle of approximately 45° relative to the access surface.

6. The attachment of claim 1, wherein the opening is surrounded by the access surface.

7. The attachment of claim 1, wherein:
the first portion of the attachment housing includes a first engagement member; and
the second portion of the attachment housing includes a second engagement member configured to be selectively engaged with the first engagement member to retain the attachment housing in the second configuration.

8. The attachment of claim 1, wherein:
the first portion of the attachment housing includes a first snap portion; and
the second portion of the attachment housing includes a second snap portion configured to be snap fitted with the first snap portion to form a hinge that hingedly connects the first portion and the second portion.

9. The attachment of claim 8, wherein:
the first portion and the second portion are rotatable relative to one another about a hinge axis of the hinge; and
the hinge axis is substantially parallel to the longitudinal axis.

10. The attachment of claim 3, wherein:
the at least one channel further includes a third branch; and
the at least one sliding tab is selectively rotatable into the third branch.

11. A hand-held rotary power tool, comprising:
a tool housing;
a rotatable mandrel received within the tool housing; and
an attachment, including:
an attachment housing configured to be coupled to the tool housing, the attachment housing including a first portion and a second portion configured to be hingedly connected together so as to be rotatable between a first configuration and a second configuration, the attachment housing being substantially shaped as a hollow cylinder defining a cavity and being centered about a longitudinal axis when the first and second portions are in the second configuration;

a sanding disk configured to be coupled to the mandrel, the sanding disk configured to be positioned in the cavity of the attachment housing, the sanding disk having a substantially planar abrasive surface that is substantially circularly shaped and is configured to rotate about an axis of rotation, the axis of rotation being substantially parallel to the longitudinal axis; and a cap configured to be coupled to the first and second portions of the attachment housing, the cap being substantially shaped as a hollow cylinder including an end that is closed by an access portion and a guiding portion, the access portion defining an access surface that is substantially parallel to the abrasive surface of the sanding disk, the guiding portion defining a guiding surface that is not parallel to the abrasive surface of the sanding disk, the access portion including an opening formed through the access surface and configured to provide access to the abrasive surface of the sanding disk when the cap is coupled to the attachment housing.

12. The tool of claim 11, wherein:
the attachment housing includes at least one channel; and
the cap includes at least one sliding tab configured to be slidably received in the at least one channel.

13. The tool of claim 12, wherein:
the at least one channel includes a trunk, a first branch, and a second branch; and
the at least one sliding tab is configured to be slidably received in the trunk and selectively rotatable into the first branch and the second branch.

14. The tool of claim 13, wherein:
when the at least one sliding tab is rotated into the first branch, the access surface is spaced apart from the abrasive surface of the sanding disk by a first distance; and when the at least one sliding tab is rotated into the second branch, the access surface is spaced apart from the abrasive surface of the sanding disk by a second distance that is different than the first distance.

15. The tool of claim 11, wherein the guiding surface is arranged at an angle of approximately 45° relative to the access surface.

16. The tool of claim 11, wherein the opening is surrounded by the access surface.

17. The tool of claim 11, wherein:
the first portion of the attachment housing includes a first engagement member; and
the second portion of the attachment housing includes a second engagement member configured to be selectively engaged with the first engagement member to retain the attachment housing in the second configuration.

18. The tool of claim 11, wherein:
the first portion of the attachment housing includes a first snap portion; and
the second portion of the attachment housing includes a second snap portion configured to be snap fitted with the first snap portion to form a hinge that hingedly connects the first portion and the second portion.

19. The tool of claim 18, wherein:
the first portion and the second portion are rotatable relative to one another about a hinge axis of the hinge; and
the hinge axis is substantially parallel to the longitudinal axis.

20. The tool of claim 13, wherein:
the at least one channel further includes a third branch; and
the at least one sliding tab is selectively rotatable into the third branch.

* * * * *